US012493154B2

(12) United States Patent
Leeson et al.

(10) Patent No.: US 12,493,154 B2
(45) Date of Patent: Dec. 9, 2025

(54) OPTICAL FIBER CONNECTOR QUICK RELEASE CLIP THAT PREVENTS DAMAGE TO AN OPTICAL FIBER CONNECTOR PULLED FROM AN ADAPTER

(71) Applicant: PPC BROADBAND, INC., East Syracuse, NY (US)

(72) Inventors: Kim Leeson, Ipswich (GB); Shaun Trezise, Aldeburgh (GB)

(73) Assignee: PPC BROADBAND, INC., East Syracuse, NY (US)

( * ) Notice: Subject to any disclaimer, the term of this patent is extended or adjusted under 35 U.S.C. 154(b) by 277 days.

(21) Appl. No.: 18/368,616

(22) Filed: Sep. 15, 2023

(65) Prior Publication Data

US 2024/0094478 A1   Mar. 21, 2024

Related U.S. Application Data

(60) Provisional application No. 63/407,028, filed on Sep. 15, 2022.

(51) Int. Cl.
*G02B 6/36* (2006.01)
*G02B 6/38* (2006.01)

(52) U.S. Cl.
CPC ......... *G02B 6/3888* (2021.05); *G02B 6/3825* (2013.01)

(58) Field of Classification Search
CPC .. G02B 6/3888; G02B 6/3825; G02B 6/3898; G02B 6/3893; G02B 6/36
See application file for complete search history.

(56) References Cited

U.S. PATENT DOCUMENTS

| | | | |
|---|---|---|---|
| 8,672,696 B2 * | 3/2014 | Sakurai | H01R 13/6315 439/247 |
| 9,599,778 B2 | 3/2017 | Wong et al. | |
| 11,016,250 B2 | 5/2021 | Higley et al. | |
| 2016/0154190 A1 * | 6/2016 | Lin | G02B 6/3893 385/76 |
| 2017/0307831 A1 * | 10/2017 | Katagiyama | G02B 6/3807 |
| 2018/0113259 A1 | 4/2018 | Zhu et al. | |
| 2018/0217339 A1 | 8/2018 | Ma et al. | |

OTHER PUBLICATIONS

International Search Report and Written Opinion dated Jan. 5, 2024 in corresponding International Application No. PCT/US2023/032833, 12 pages.

* cited by examiner

*Primary Examiner* — Jennifer Doan
(74) *Attorney, Agent, or Firm* — MH2 TECHNOLOGY LAW GROUP LLP

(57) ABSTRACT

A retention portion configured to enable release of a cable connector from an adapter without manipulation of the retention portion or the connector by a user, includes: a first portion; and a second portion extending from the first portion. The first portion may comprise an adapter engaging portion that may engage a receiving portion of an adapter; the second portion may move a withdrawal resisting portion of a connector out of engagement with the second portion as the withdrawal resisting portion moves in a withdrawal direction relative to the first portion; and the second portion may be configured to permit the connector to be released from the adapter without manipulation of the connector by a user so as to prevent damage to the connector from the connector being pulled out of the adapter in the withdrawal direction by a force exerted on a cable connected to the connector.

23 Claims, 9 Drawing Sheets

OPTICAL FIBER CONNECTOR QUICK RELEASE CLIP THAT PREVENTS DAMAGE TO AN OPTICAL FIBER CONNECTOR PULLED FROM AN ADAPTER

CROSS-REFERENCE TO RELATED APPLICATION

This application claims the benefit of U.S. Provisional Application No. 63/407,028 filed Sep. 15, 2022, the disclosure of which is hereby incorporated by reference herein in its entirety.

BACKGROUND

The present disclosure generally relates to connectors having a release that is structurally configured to be permit the connectors to be removed from a receptacle in response to an accidental, unintentional, or other pulling force on the cable to which the connector is attached, and more specifically to Lucent Connector (LC) duplex adapters and narrow width multi-fiber connectors.

Some conventional adapters are configured to receive a connector and include a feature that prevents the connector from being accidentally or unintentionally withdrawn from the adapter in the case of a pulling force on the cable to which the connector is attached (for example, a person tripping over the cable). However, prevention of the accidental or unintentional withdrawal of the connector from the adapter can lead to damage to the cable, the connector, and/or the adapter.

It may be desirable to provide a release that is structurally configured to permit a connector to be removed from an adapter in response to an accidental, unintentional, or other pulling force on the cable to which the connector is attached. It may be desirable for the release to permit the connector to be removed from an adapter in response to an accidental, unintentional, or other pulling force on the cable that is lower than a force that will cause damage to the cable, the connector, and/or the adapter.

SUMMARY

The present disclosure provides a clip that is configured to be installed on the adapter and circumvents a retaining feature of the adapter designed to prevent the connector from being removed from the adapter. Embodiments are configured to be retro-fitted to existing adapters and allow the user of existing connectors.

Exemplary embodiments of the disclosure provide a quick release mechanism that enables an optical fiber cable connector to be released undamaged from an adapter without manipulation of the optical fiber cable connector by a user.

Embodiments provide a clip structurally configured to enable release of a cable connector from an adapter without manipulation of the clip or the cable connector by a user, including a body portion, and an extension portion extending from the body portion. The body portion may comprise an adapter engaging portion; the adapter engaging portion may be structurally configured to engage a receiving portion of an adapter; the extension portion may comprise a protrusion; the protrusion may be structurally configured to engage a withdrawal resisting portion of a cable connector; the protrusion may comprise a transitioning surface; the transitioning surface may be structurally configured to move the withdrawal resisting portion of the cable connector out of engagement with the protrusion as the withdrawal resisting portion moves in a withdrawal direction relative to the body portion; and the transitioning surface may be structurally configured to permit the cable connector to be released from the adapter without manipulation of the cable connector by a user so as to prevent damage to the cable connector from the cable connector being pulled out of the adapter in the withdrawal direction by a force exerted on a cable connected to the cable connector.

In particular embodiments, the transitioning surface may be structurally configured to release the cable connector from the adapter in response to a force exerted on the cable that is less than a force that would cause damage to the cable connector, the adapter, or the cable.

In particular embodiments, the extension portion may be a first extension portion, and the clip may further comprise a second extension portion.

In particular embodiments, the withdrawal resisting portion of the cable connector may be on a lever portion of the cable connector.

In particular embodiments, the lever portion of the cable connector may be resilient in a direction perpendicular to the withdrawal direction.

In particular embodiments, the transitioning surface may be a ramped surface.

In particular embodiments, the cable connector may be an optical fiber cable connector.

In particular embodiments, the adapter engaging portion of the body may comprise a ramped portion and a stepped portion.

In particular embodiments, the stepped portion of the adapter engaging portion may be structurally configured to engage the receiving portion of the adapter when the body is moved relative to the adapter in the withdrawal direction.

In particular embodiments, the ramped portion of the adapter engaging portion may be structurally configured to gradually move the adapter engaging portion away from the adapter in a direction perpendicular to the withdrawal direction as the body is moved relative to the adapter in a direction opposite to the withdrawal direction.

Embodiments provide a retention portion structurally configured to enable release of a cable connector from an adapter without manipulation of the retention portion or the cable connector by a user, including a body portion, and an extension portion extending from the body portion. The body portion may comprise an adapter engaging portion; the adapter engaging portion may be structurally configured to engage a receiving portion of an adapter; the extension portion may be structurally configured to move a withdrawal resisting portion of a cable connector out of engagement with the extension portion as the withdrawal resisting portion moves in a withdrawal direction relative to the body portion; and the extension portion may be structurally configured to permit the cable connector to be released from the adapter without manipulation of the cable connector by a user so as to prevent damage to the cable connector from the cable connector being pulled out of the adapter in the withdrawal direction by a force exerted on a cable connected to the cable connector.

In particular embodiments, the extension portion may be structurally configured to release the cable connector from the adapter in response to a force exerted on the cable that is less than a force that would cause damage to the cable connector, the adapter, or the cable.

In particular embodiments, the extension portion may comprise a protrusion.

In particular embodiments, the protrusion may comprise a transitioning surface.

In particular embodiments, the protrusion may be structurally configured to engage the withdrawal resisting portion of the cable connector.

In particular embodiments, the extension portion may be a first extension portion, and the retention portion may further comprise a second extension portion.

In particular embodiments, the withdrawal resisting portion of the cable connector may be on a lever portion of the cable connector.

In particular embodiments, the adapter engaging portion of the body portion may comprise a ramped portion and a stepped portion, the stepped portion of the adapter engaging portion may be structurally configured to engage the receiving portion of the adapter when the body portion is moved relative to the adapter in the withdrawal direction, and the ramped portion of the adapter engaging portion may be structurally configured to gradually move adapter engaging portion away from the adapter in a direction perpendicular to the withdrawal direction as the body portion is moved relative to the adapter in a direction opposite to the withdrawal direction.

Embodiments provide a retention portion structurally configured to enable release of a cable connector from an adapter without manipulation of the retention portion or the cable connector by a user, including a first portion, and a second portion extending from the first portion. The first portion may comprise an adapter engaging portion that is structurally configured to engage a receiving portion of an adapter; the second portion may be structurally configured to move a withdrawal resisting portion of a cable connector out of engagement with the second portion as the withdrawal resisting portion moves in a withdrawal direction relative to the first portion; and the second portion may be structurally configured to permit the cable connector to be released from the adapter without manipulation of the cable connector by a user so as to prevent damage to the cable connector from the cable connector being pulled out of the adapter in the withdrawal direction by a force exerted on a cable connected to the cable connector.

In particular embodiments, the second portion may be structurally configured to release the cable connector from the adapter in response to a force exerted on the cable that is less than a force that would cause damage to the cable connector, the adapter, or the cable.

In particular embodiments, the withdrawal resisting portion of the cable connector may be on a lever portion of the cable connector.

In particular embodiments, the second portion may comprise a protrusion, and the protrusion may comprise a transitioning surface.

In particular embodiments, the first portion may comprise a body portion, and the second portion ma comprise an extension portion that is structurally configured to extend from the body portion.

Various aspects of the system, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments of the disclosure provide a quick release mechanism that enables an optical fiber cable connector to be released undamaged from an adapter without manipulation of the optical fiber cable connector by a user so as to prevent damage to the cable connector that would otherwise result from the cable connector being pulled in a direction out of the adapter by force exerted on the cable.

Figure 1:
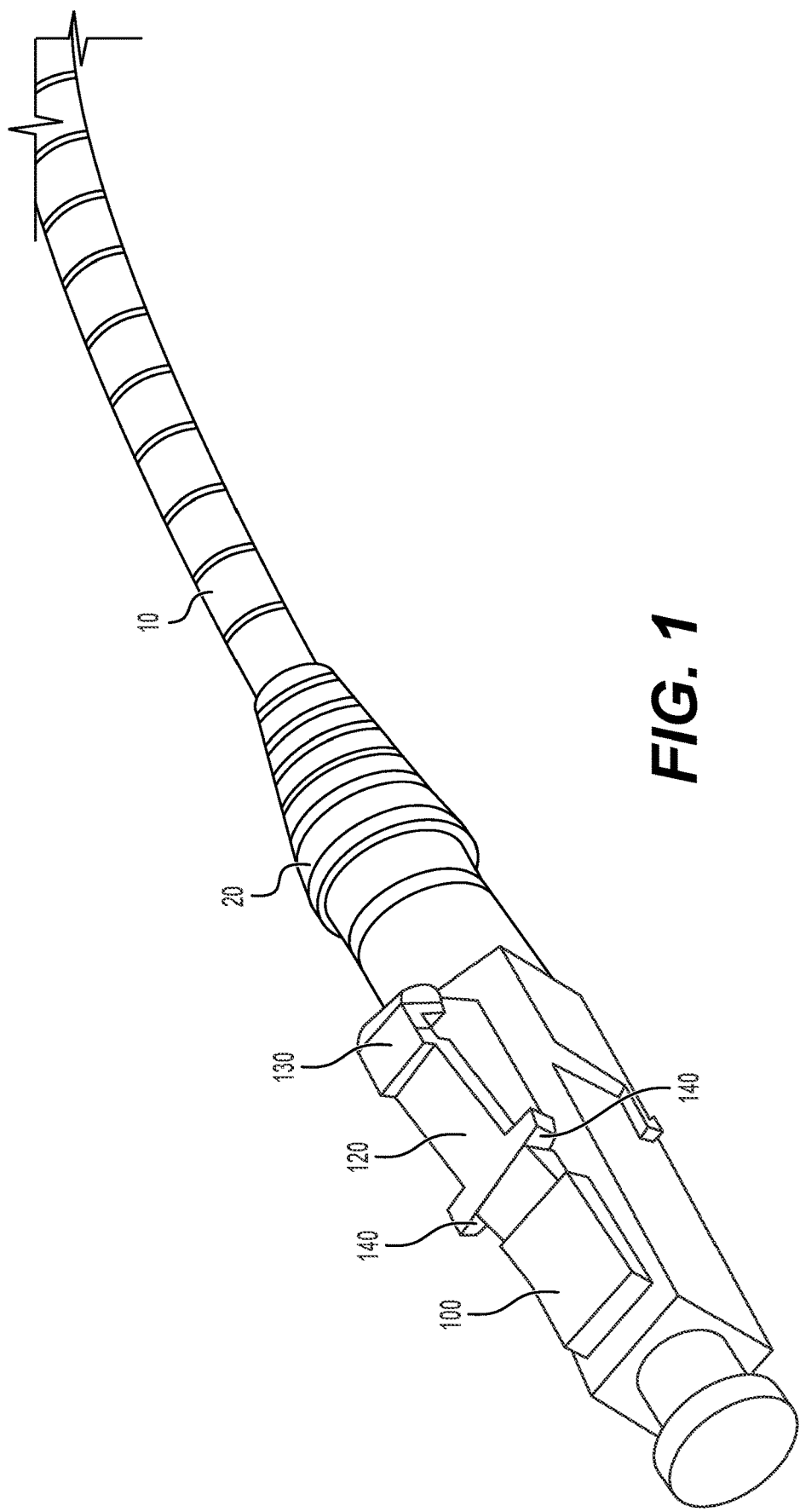
FIG. 1 is a perspective view of an LC connector connected to a fiber optic cable.

FIG. 1 shows a fiber optic cable 10 having a ferrule 20 that is connected to a connector 100. In this example, connector 100 is a Lucent Connector (LC).

Figure 2:
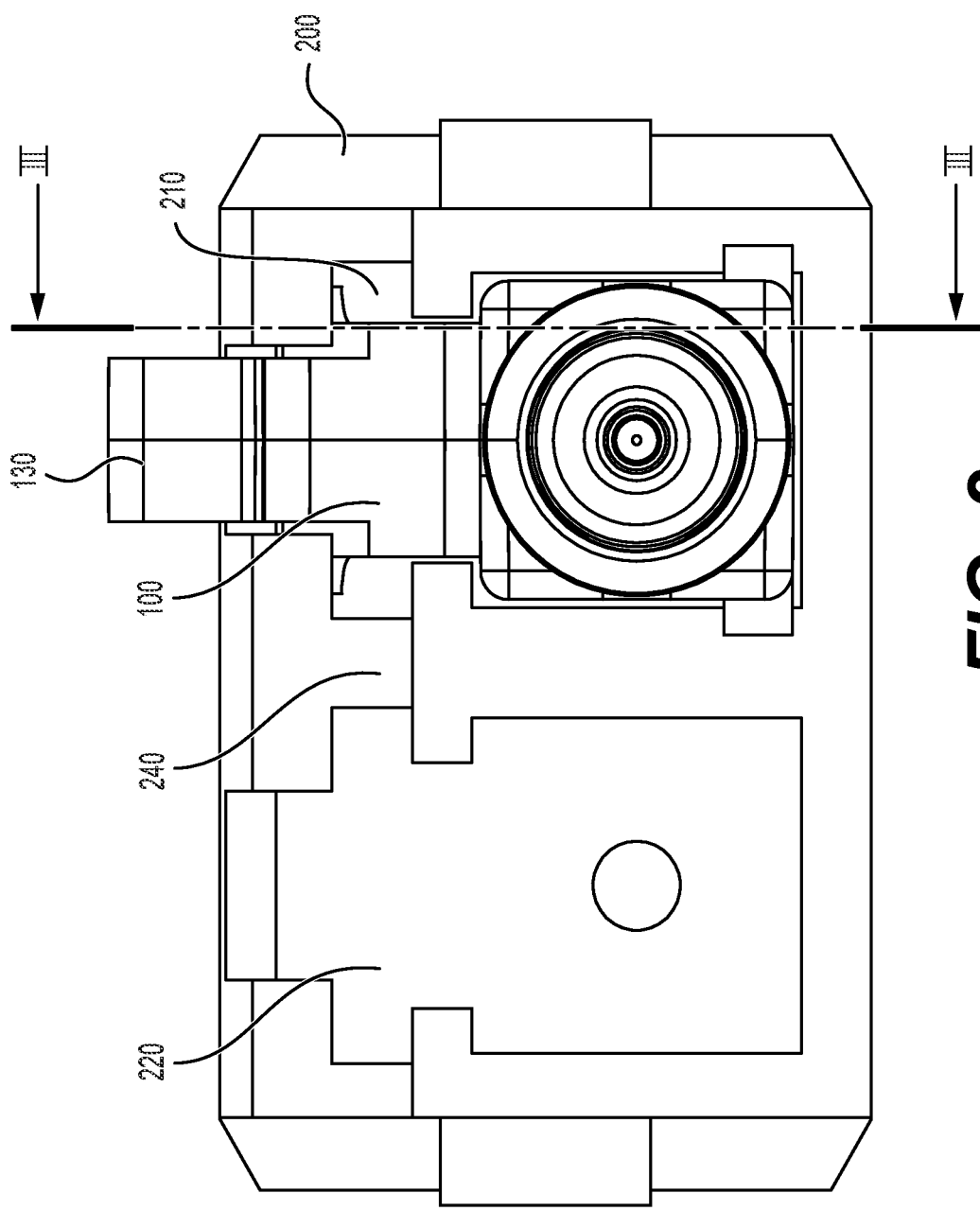
FIG. 2 is a front view of the connector of FIG. 1 installed in a bulk head adapter.

FIG. 2 is a front view of an adapter 200 that is, in this example, a duplex adapter that is configured to receive two connectors 100. In FIG. 2, one connector 100 is shown inserted into a port 210 in adapter 200. Adapter 200 has a second port 220 that is shown in FIG. 2 as not being occupied by a connector. Adapter 200 has, in this example, a central wall 240 that separates an upper portion of port 210 from an upper portion of port 220.

Figure 3:
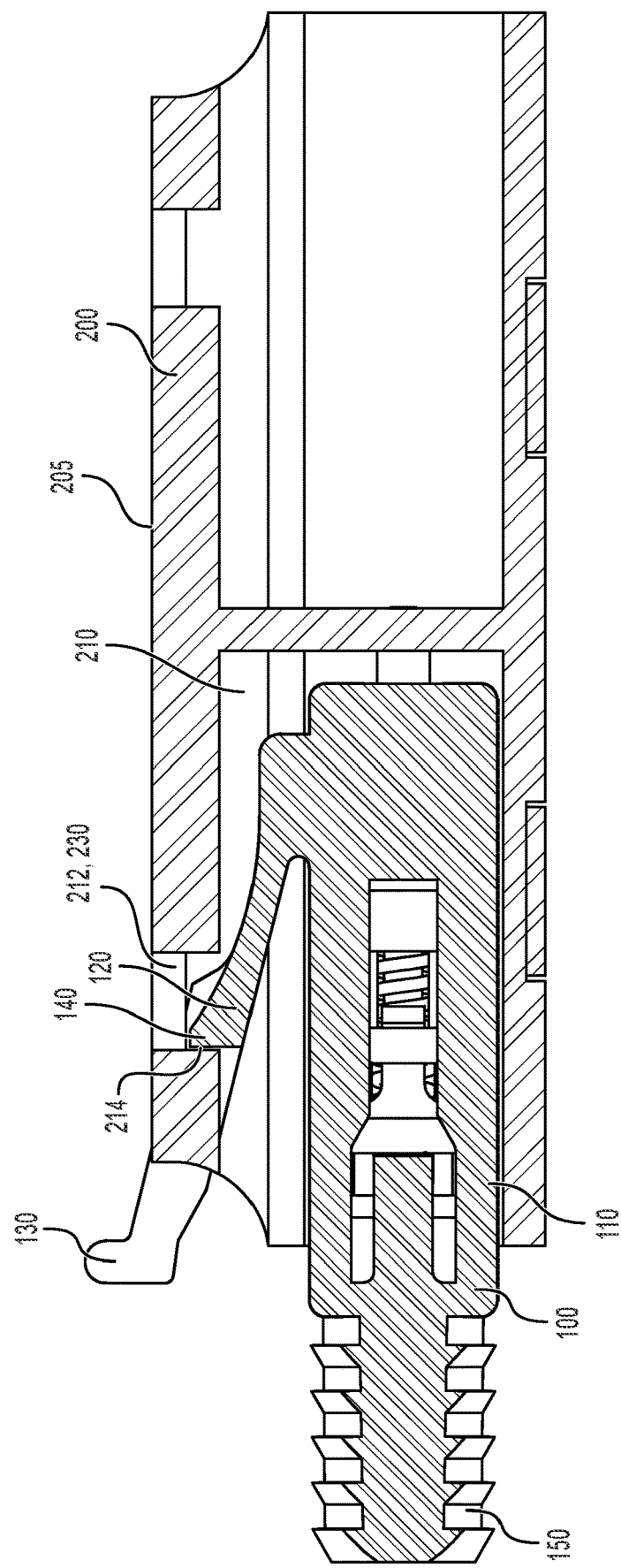
FIG. 3 is a sectional view of the connector/adapter assembly of FIG. 2 taken along section line III-III.

FIG. 3 is a sectional view of adapter 200 and connector 100 taken along section line in FIG. 2. FIG. 3 shows connector 100 located in port 210 in a fully engage position in which connector 100 connects one or more optical fibers in fiber optic cable 10 to adapter 200. In this example, connector 100 has a main body 110 that is configured to fit in a lower portion of port 210. Connector 100 has a lever 120 that extends upward from main body 110 and toward a rear (cable) end of main body 110. Lever 120 is elastic and is configured to return to the resting position shown in FIG. 1. Adapter 200 has a plurality of openings 230 (shown in FIG. 4) in an upper surface 205 of adapter 200. Two of openings 230 extend down to port 210 and are also designated by reference numbers 212, and two of openings 230 extend down to port 220 and are also designated by reference numbers 222. Each opening 212 has an engagement face 214 that is configured to engage a withdrawal resisting portion, for example, an engagement portion 140 that is located on each side of lever 120 (shown in FIG. 1). FIG. 3 shows one engagement portion 140 engaged with one engagement face 214. This same engagement also exists between the engagement portion 140 on the other side of lever 120 and the engagement face 214 in the second opening 212. The engagement of engagement portions 140 with engagement faces 214 prevents connector 100 from being removed from port 210. In this example, lever 120 has an end 130 that is configured to be pressed downward (toward main body 110) to move engagement portions 140 downward to a point where engagement portions 140 are outside of openings 212 to allow connector 100 to be moved out of port 210 without damaging connector 100 of adapter 200. In the example shown in FIG. 3, connector 100 has a contoured area 150 that grips an inside of ferrule 20 to maintain a connection between fiber optic cable 10 and connector 100.

Figure 4:
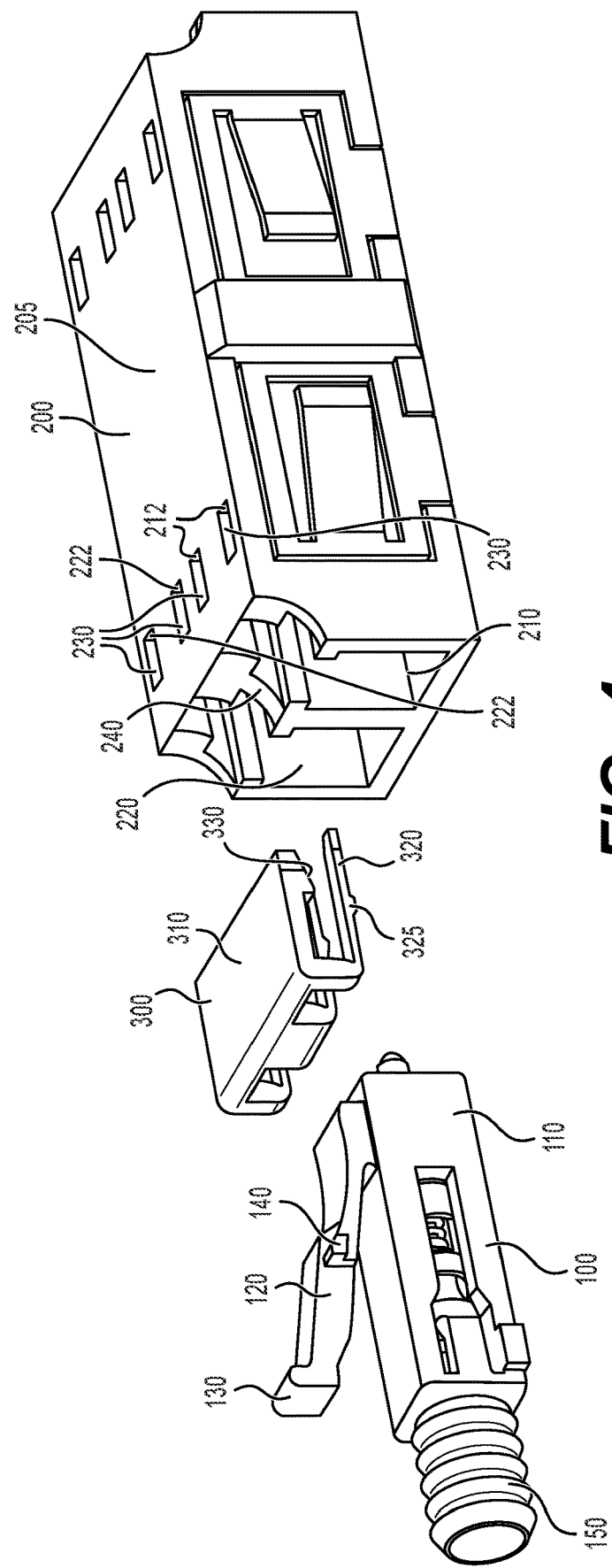
FIG. 4 is an exploded perspective view of an exemplary LC connector quick release clip in accordance with various aspects of the disclosure and an associated LC connector and bulkhead adapter.

FIG. 4 shows connector 100 separate from adapter 200. FIG. 4 also shows an exemplary quick release clip 300 in accordance with embodiments of the disclosure. In FIG. 4, lever 120 is shown in the rest position. In this example, quick release clip 300 has a first portion, for example, a main body, 310 from which a second portion, for example, an extension portion (in this example, four fingers) 320 extends. In this example, each finger 320 extends downwardly from main body 310 and then turns at an approximately ninety-degree angle to further extend approximately parallel to main body 310. In this example, an adapter engaging portion, for example, four protrusions 330, extends downwardly from main body 310 and is configured to engage openings 230 (212, 222) in upper surface 205 of adapter 200. In this example, each finger 320 has a protrusion, for example, an engagement protrusion, 325 that extends downwardly from a bottom surface of finger 320. Engagement protrusions 325 are configured to each engage one engagement portion 140 on lever 120.

Figure 5:
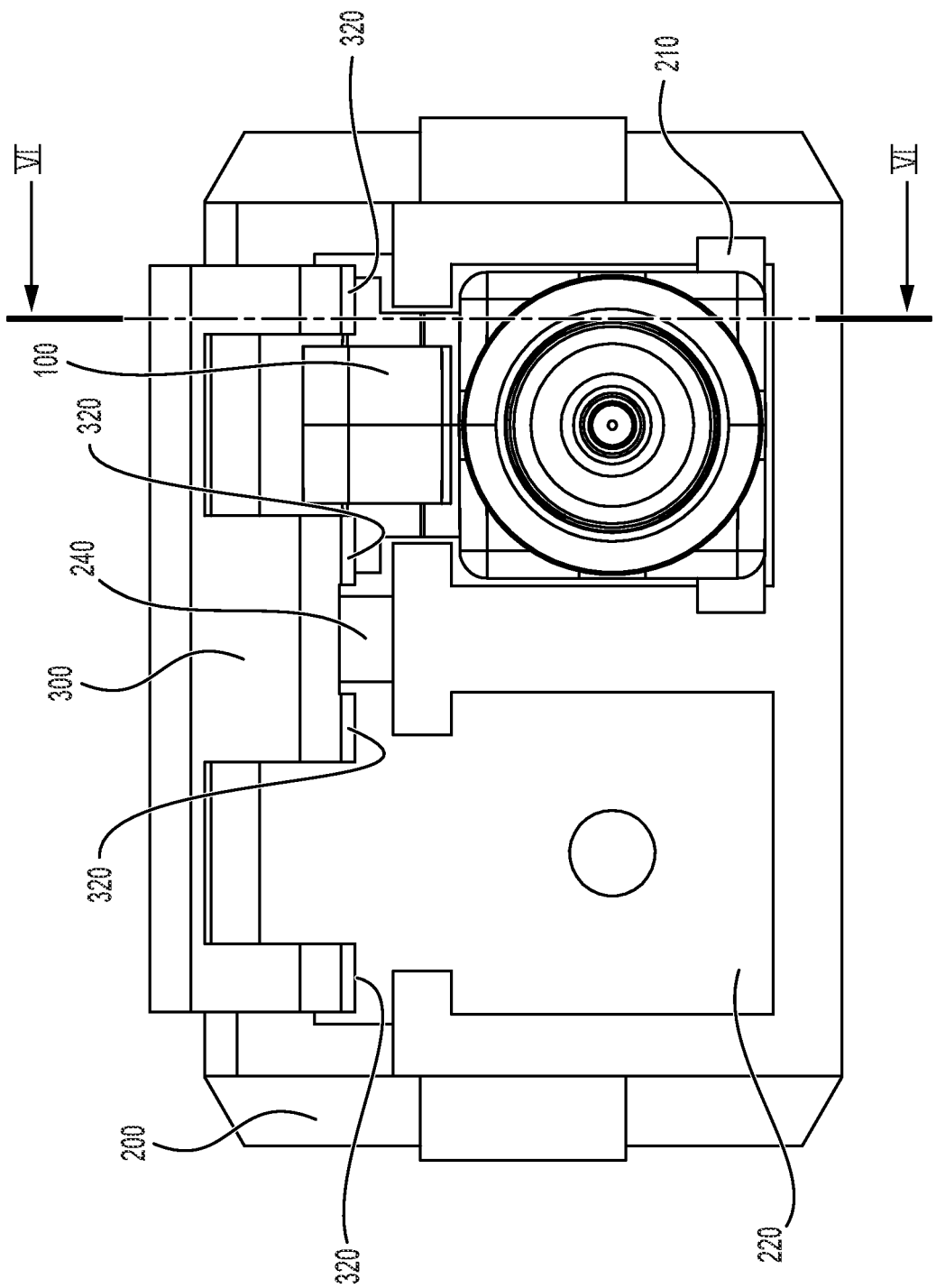
FIG. 5 is a front view of the connector of FIG. 1 installed in a bulk head adapter using the quick release clip shown in FIG. 4.
Figure 6:
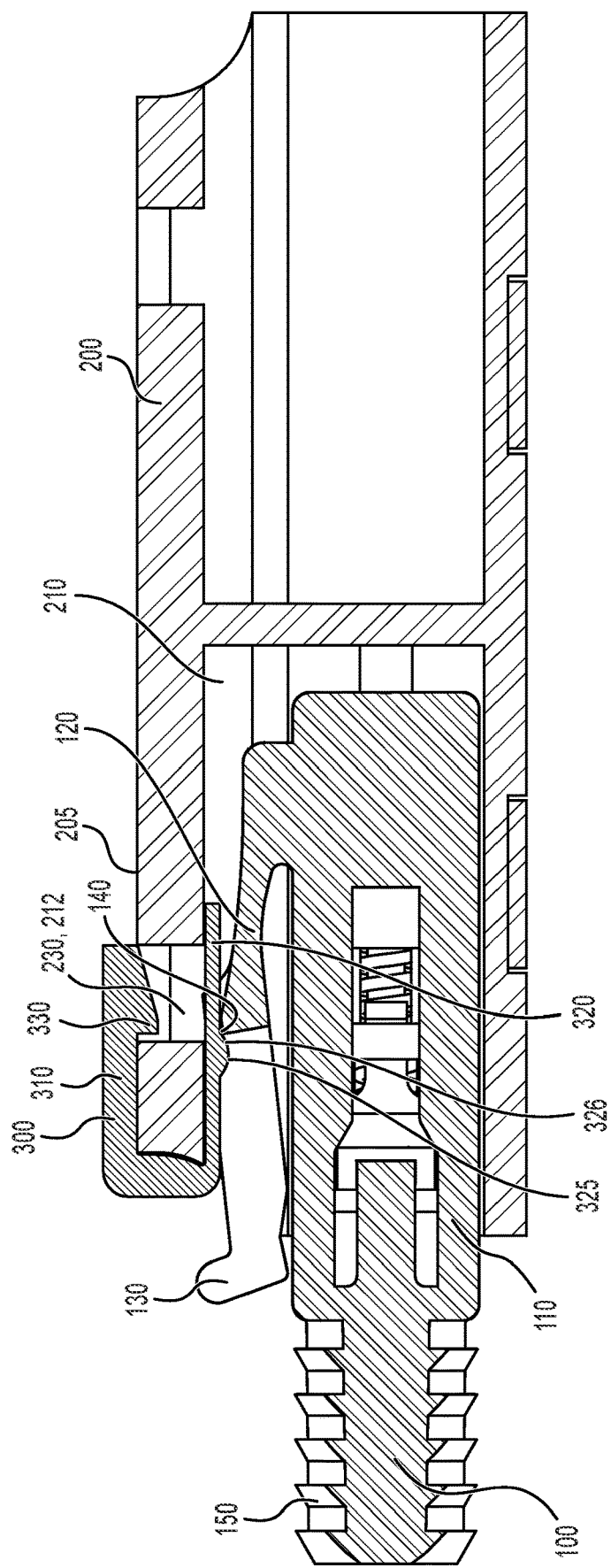
FIG. 6 is a sectional view of the connector/adapter/clip assembly of FIG. 5 taken along section line VI-VI.

FIGS. 5 and 6 show an example of quick release clip 300 in place on adapter 200. FIG. 6 is a section through adapter 200, connector 100, and quick release clip 300 taken along section line VI-VI in FIG. 5. One of the protrusions 330 on main body 310 of quick release clip 300 is shown in FIG. 6 engaging opening 230, 212. The engagement between protrusions 330 and openings 230 keep quick release clip 300 in place on adapter 200. Two of fingers 320 extend into port 210, and two of fingers 320 extend into port 220. As seen in FIG. 6, lever 120 is pressed downward (toward main body 110 of connector 100) due to contact between an upper surface of lever 120 and a lower surface of quick release clip 300.

A comparison of FIG. 3 and FIG. 6 shows that lever 120 is in one position if quick release clip 300 is not used, and a different position when quick release clip is used. In FIG. 6, lever 120 is in a position in which engagement portions 140 engage engagement protrusions 325 instead of openings 230, 212. In this example, engagement protrusions 325 are rounded bumps that have a transitioning surface, for example, a sloped surface on at least their forward most face 326. The sloped, or otherwise gradually transitioning, shape of face 326 is a less abrupt surface than that of engagement face 214 of opening 230, 212. This gradually transitioning shape of face 326 allows engagement portion 140 to pass by engagement protrusion 325 more easily than by engagement face 214. As a result, less force on connector 100 (in a direction away from adapter 200) is needed to remove connector 100 from port 212 when quick release clip 300 is used. In embodiments, connector 100 is released from engagement with quick release clip 300 without damage to connector 100 or adapter 200 when force above a particular threshold is exerted on cable 10 (for example, when a person trips over cable 10 and pulls it away from adapter 200). In contrast, without quick release clip 300 installed (as shown in FIGS. 2 and 3), the engagement between engagement portion 140 and engagement face 214 (for example, two flat surfaces perpendicular to a removal force contacting each other) is such that removal without pressing end 130 downward can result in damage to connector 100, adapter 200 and/or cable 10.

Figure 7:
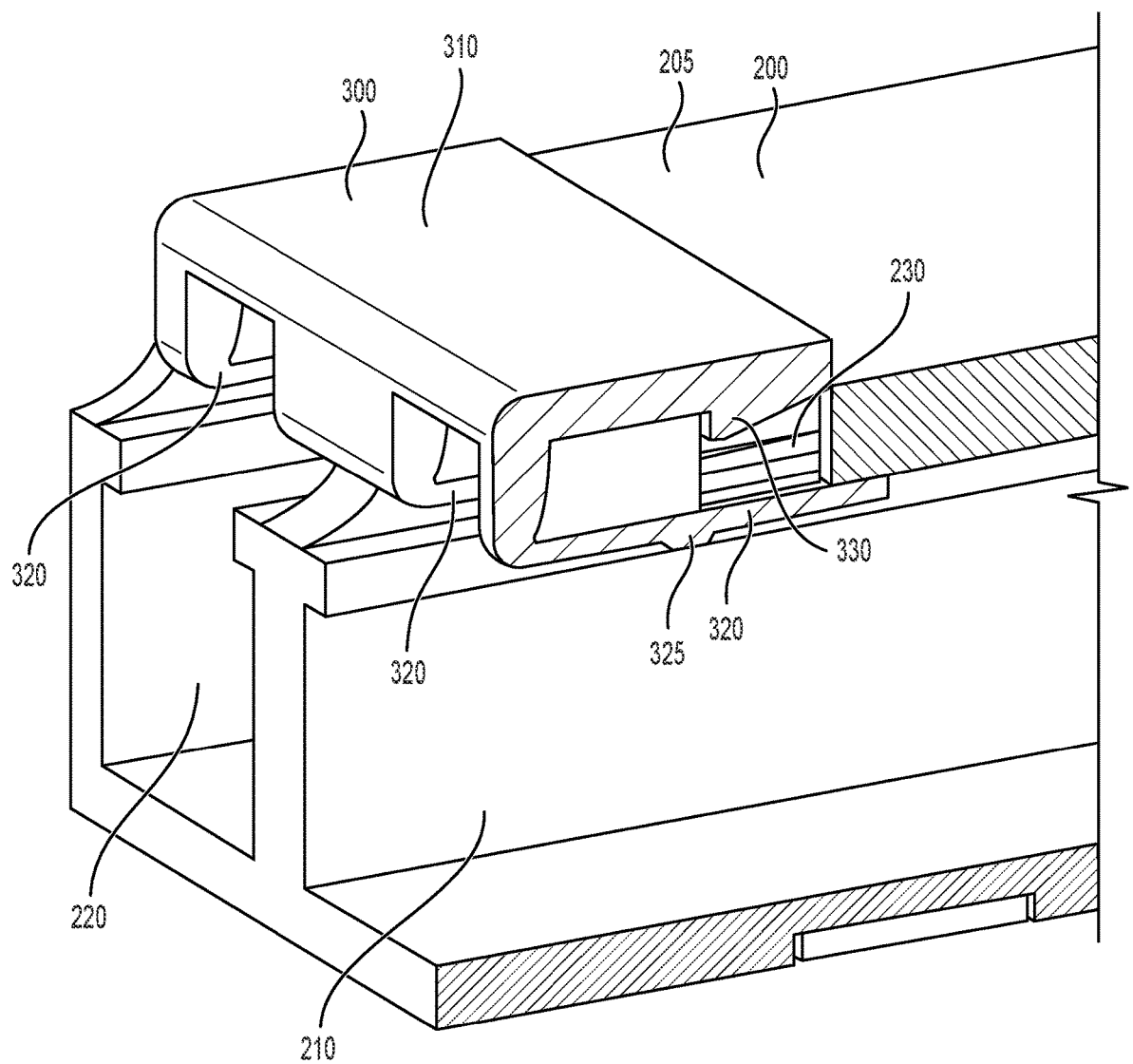
FIG. 7 is a perspective view of the quick release clip shown in FIG. 4 in an installed state.
Figure 8:
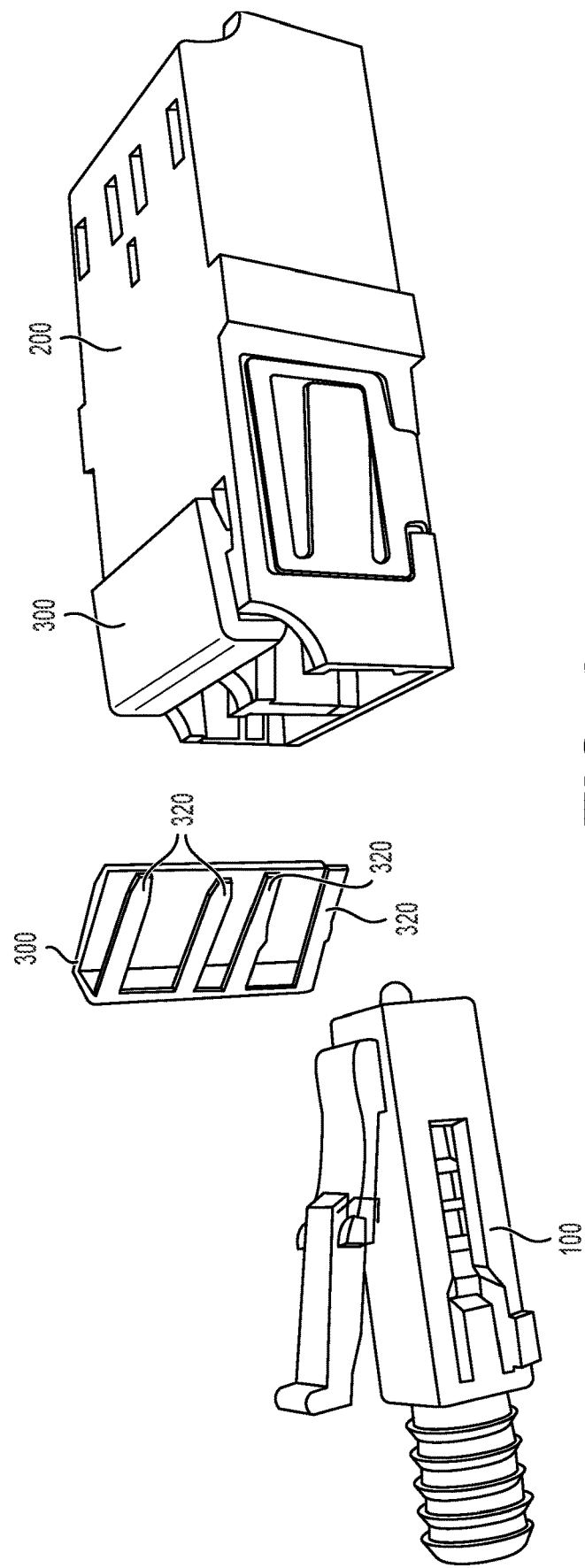
FIG. 8 is a perspective view of the quick release clip of FIG. 4 in an installed state on the bulkhead adapter, the LC connector not installed in the bulkhead adapter, and an underside view of a second quick release clip of FIG. 4.

FIG. 7 is a partial sectional view of quick release clip 300 installed on adapter 200. FIG. 8 shows quick release clip 300 installed on adapter 200 without adapter 100 installed in port 212. Quick release clip 300 can be installed on adapter 200 before the first time connector 100 is inserted into port 212 (new installations), or quick release clip can be retro-fitted to existing installations by removing connector 100 from port 212 (or 222), installing quick release clip 300 on adapter 200, and then reinstalling connector 100 in port 212 (or 222). Also shown in FIG. 8 is a second quick release clip 300 to illustrate the (in this example) four fingers 320.

Figure 9:
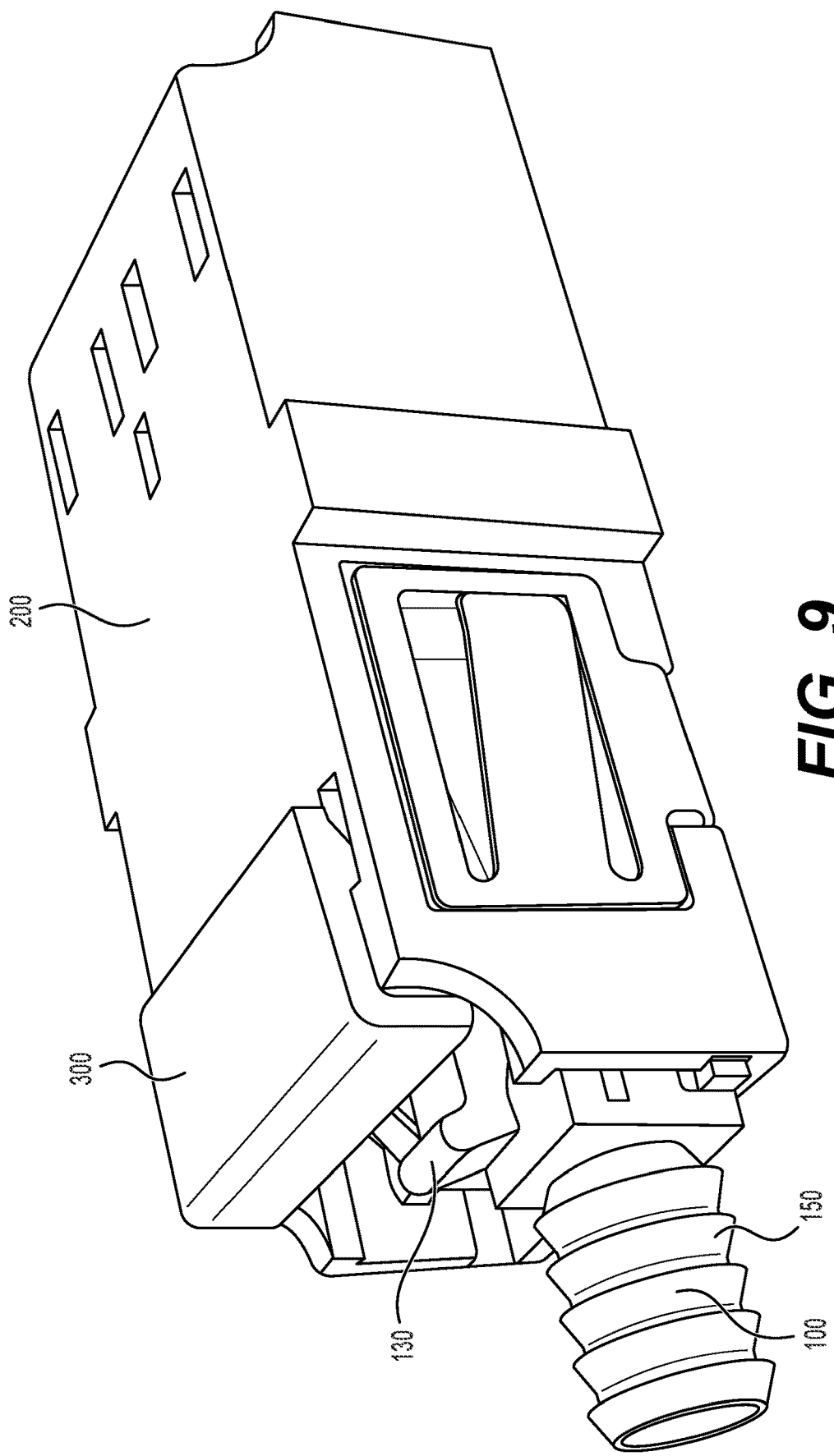
FIG. 9 is a perspective view of the quick release clip of FIG. 4 installed on the bulkhead adapter with the LC connector in place in the bulkhead adapter.

FIG. 9 is a perspective view of connector 100 in an installed state in adapter 200 with quick release clip 300 installed on adapter 200.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A clip structurally configured to enable release of a cable connector from an adapter without manipulation of the clip or the cable connector by a user, comprising:
   a body portion;
   an extension portion extending from the body portion;
   wherein the body portion comprises an adapter engaging portion;
   wherein the adapter engaging portion is structurally configured to engage a receiving portion of an adapter;
   wherein the extension portion comprises a protrusion;
   wherein the protrusion is structurally configured to engage a withdrawal resisting portion of a cable connector;
   wherein the protrusion comprises a transitioning surface;
   wherein the transitioning surface is structurally configured to move the withdrawal resisting portion of the cable connector out of engagement with the protrusion as the withdrawal resisting portion moves in a withdrawal direction relative to the body portion; and
   wherein the transitioning surface is structurally configured to permit the cable connector to be released from the adapter without manipulation of the cable connector by a user so as to prevent damage to the cable connector from the cable connector being pulled out of the adapter in the withdrawal direction by a force exerted on a cable connected to the cable connector.

2. The clip of claim 1, wherein the transitioning surface is structurally configured to release the cable connector from the adapter in response to a force exerted on the cable that is less than a force that would cause damage to the cable connector, the adapter, or the cable.

3. The clip of claim 1, wherein the extension portion is a first extension portion, and the clip further comprises a second extension portion.

4. The clip of claim 1, wherein the withdrawal resisting portion of the cable connector is on a lever portion of the cable connector.

5. The clip of claim 4, wherein the lever portion of the cable connector is resilient in a direction perpendicular to the withdrawal direction.

6. The clip of claim 1, wherein the transitioning surface is a ramped surface.

7. The clip of claim 1, wherein the cable connector is an optical fiber cable connector.

8. The clip of claim 1, wherein the adapter engaging portion of the body comprises a ramped portion and a stepped portion.

9. The clip of claim 8, wherein the stepped portion of the adapter engaging portion is structurally configured to engage the receiving portion of the adapter when the body is moved relative to the adapter in the withdrawal direction.

10. The clip of claim 8, wherein the ramped portion of the adapter engaging portion is structurally configured to gradually move the adapter engaging portion away from the adapter in a direction perpendicular to the withdrawal direction as the body is moved relative to the adapter in a direction opposite to the withdrawal direction.

11. A retention portion structurally configured to enable release of a cable connector from an adapter without manipulation of the retention portion or the cable connector by a user, comprising:
a body portion;
an extension portion extending from the body portion;
wherein the body portion comprises an adapter engaging portion;
wherein the adapter engaging portion is structurally configured to engage a receiving portion of an adapter;
wherein the extension portion is structurally configured to move a withdrawal resisting portion of a cable connector out of engagement with the extension portion as the withdrawal resisting portion moves in a withdrawal direction relative to the body portion; and
wherein the extension portion is structurally configured to permit the cable connector to be released from the adapter without manipulation of the cable connector by a user so as to prevent damage to the cable connector from the cable connector being pulled out of the adapter in the withdrawal direction by a force exerted on a cable connected to the cable connector.

12. The retention portion of claim 11, wherein the extension portion is structurally configured to release the cable connector from the adapter in response to a force exerted on the cable that is less than a force that would cause damage to the cable connector, the adapter, or the cable.

13. The retention portion of claim 11, wherein the extension portion comprises a protrusion.

14. The retention portion of claim 13, wherein the protrusion comprises a transitioning surface.

15. The retention portion of claim 13, wherein the protrusion is structurally configured to engage the withdrawal resisting portion of the cable connector.

16. The retention portion of claim 11, wherein the extension portion is a first extension portion, and the retention portion further comprises a second extension portion.

17. The retention portion of claim 11, wherein the withdrawal resisting portion of the cable connector is on a lever portion of the cable connector.

18. The retention portion of claim 11, wherein the adapter engaging portion of the body portion comprises a ramped portion and a stepped portion,
the stepped portion of the adapter engaging portion is structurally configured to engage the receiving portion of the adapter when the body portion is moved relative to the adapter in the withdrawal direction, and
the ramped portion of the adapter engaging portion is structurally configured to gradually move adapter engaging portion away from the adapter in a direction perpendicular to the withdrawal direction as the body portion is moved relative to the adapter in a direction opposite to the withdrawal direction.

19. A retention portion structurally configured to enable release of a cable connector from an adapter without manipulation of the retention portion or the cable connector by a user, comprising:
a first portion;
a second portion extending from the first portion;
wherein the first portion comprises an adapter engaging portion that is structurally configured to engage a receiving portion of an adapter;
wherein the second portion is structurally configured to move a withdrawal resisting portion of a cable connector out of engagement with the second portion as the withdrawal resisting portion moves in a withdrawal direction relative to the first portion; and
wherein the second portion is structurally configured to permit the cable connector to be released from the adapter without manipulation of the cable connector by a user so as to prevent damage to the cable connector from the cable connector being pulled out of the adapter in the withdrawal direction by a force exerted on a cable connected to the cable connector.

20. The retention portion of claim 19, wherein the second portion is structurally configured to release the cable connector from the adapter in response to a force exerted on the cable that is less than a force that would cause damage to the cable connector, the adapter, or the cable.

21. The retention portion of claim 19, wherein the withdrawal resisting portion of the cable connector is on a lever portion of the cable connector.

22. The retention portion of claim 19, wherein the second portion comprises a protrusion, and the protrusion comprises a transitioning surface.

23. The retention portion of claim 19, wherein the first portion comprises a body portion, and the second portion comprises an extension portion that is structurally configured to extend from the body portion.

* * * * *